July 8, 1969 L. H. STRAUSS 3,454,897
RIGHT CYLINDRICAL LASER WITH CENTER EMISSION
Filed Nov. 7, 1966

INVENTOR
LEWIS H. STRAUSS

BY *Semmes & Semmes*

ATTORNEYS

July 8, 1969 L. H. STRAUSS 3,454,897
RIGHT CYLINDRICAL LASER WITH CENTER EMISSION
Filed Nov. 7, 1966
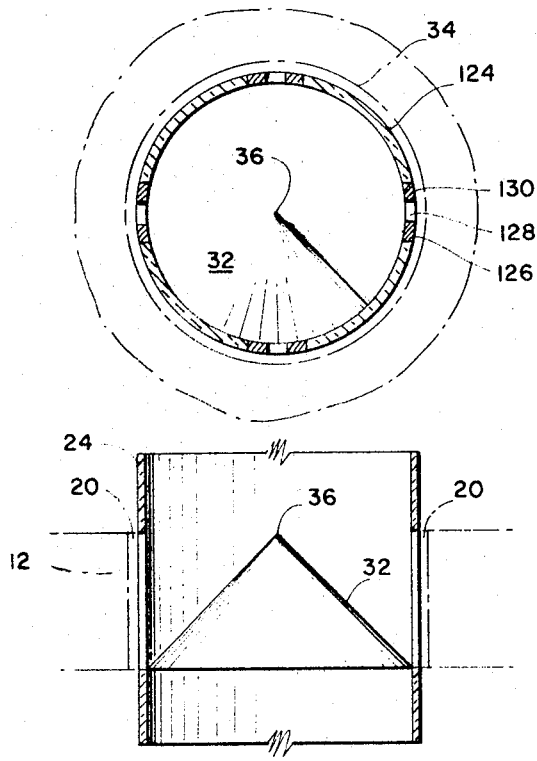
FIG. 4
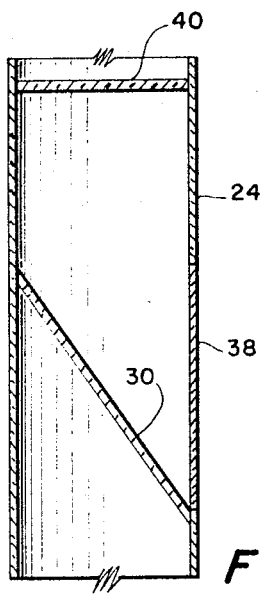
FIG. 3
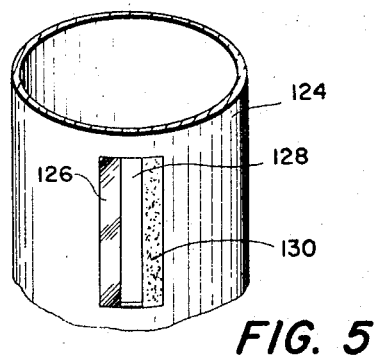
FIG. 5
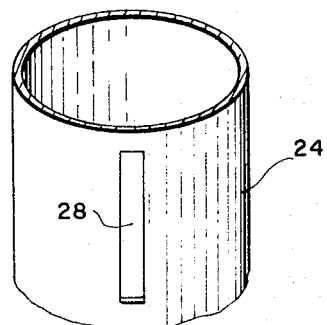
FIG. 6
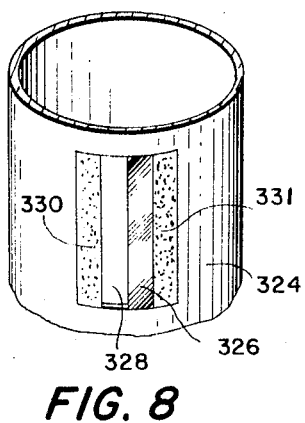
FIG. 8
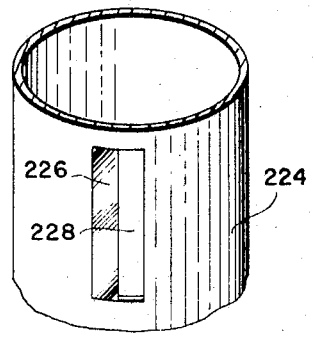
FIG. 7
FIG. 9
INVENTOR
LEWIS H. STRAUSS
BY Semmes & Semmes
ATTORNEYS

United States Patent Office 3,454,897
Patented July 8, 1969

3,454,897
RIGHT CYLINDRICAL LASER WITH CENTER EMISSION
Lewis H. Strauss, 1250 Connecticut Ave. NW.,
Washington, D.C. 20036
Filed Nov. 7, 1966, Ser. No. 596,045
Int. Cl. H01s 3/04, 3/05
U.S. Cl. 331—94.5
10 Claims

---

The present application is directed to laser construction, particularly a cylindrical laser using internal reflection techniques to provide both resonating and continuous volume.

Current lasers consist of an active material whose population can be inverted by pumping from an external energy source. This material is customarily arranged in the form of a long tube or rod, with reflecting surfaces at either end, either parallel or confocal. One of these mirrors is often partially transmitting to enable the pulse of laser light to escape from the end of the rod. This mechanical arrangement is referred to as a cavity, since it is completely analogous to a radio frequency cavity designed essentially for the same purpose.

The amount of power which can be extracted from such a laser system, all other things being equal, depends, of course, on the amount of material whose population has been inverted, and this material is that which lies between the two reflecting mirrors. The present invention includes then an alternate arrangement for providing a resonating volume and a continuous volume so that more material can be involved in the laser action and the power thereby increased.

Accordingly, it is an object of invention to provide an improved laser construction wherein both resonating and continuous volume may be efficiently obtained.

Another object of invention is to provide in a cylindrical laser construction means for the axial deflection of light.

Another object of invention is to provide a cylindrical laser construction which may be readily modified to provide any pre-selected pulse length and duty cycle.

Yet, additional objects of invention will become apparent from the ensuing specification and attached drawings, wherein:

FIG. 3 is a modification of invention wherein the axially deflecting mirror 32 positioned within the extensively mirrored tube 24 is in the form of a cone having a 90° vertex;

FIG. 4 is a top plan view of the FIG. 3 modification;

Figure 1:
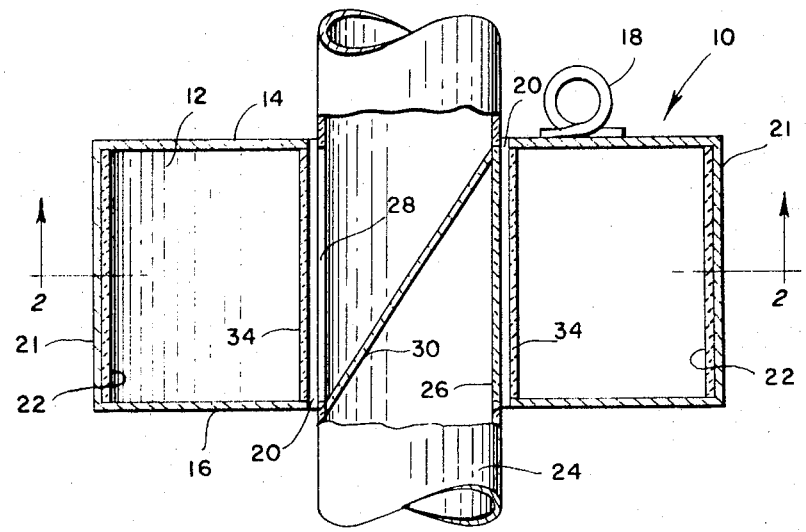
FIG. 1 is a partially fragmentary vertical sectional view of the proposed arrangement between the right circular cylinder of active laser material and the exteriorly mirrored tube extending through the laser material and rotatably supported co-axially therein.

FIG. 5 is a fragmentary, perspective of the FIG. 3 and 4 modification, showing the transparent vertical slit 128 with respect to its leading edge mirror 130 and its trailing edge quench strip 126;

FIG. 6 is a fragmentary, perspective showing the FIG. 1 exteriorly mirrored tube with a single vertical slot 28;

FIG. 7 is a further modification of invention showing the axial tube 224 having only leading edge mirror 226 positioned adjacent the transparent vertical slit 228;

FIG. 8 is a further modification of invention showing the transparent slit having both quench portion and mirror portion on the leading edge and a quench portion on the trailing edge, and;

FIG. 9 is a fragmentary schematic showing of axial tube construction supporting one or more polarizing elements 38 and 40.

In FIG. 1 the proposed laser arrangement 10 is illustrated as comprising a right circular cylinder 12 made of the active laser material, solid or gaseous, contained within top 14, bottom 16, peripheral wall 22 and inner wall 34. A radially inwardly reflecting mirror 22 is supported within the peripheral wall 21.

A light pump 18 or any other suitable pumping source (schematically illustrated) is operatively associated with the active laser material for the purposes hereinafter described.

Figure 2:
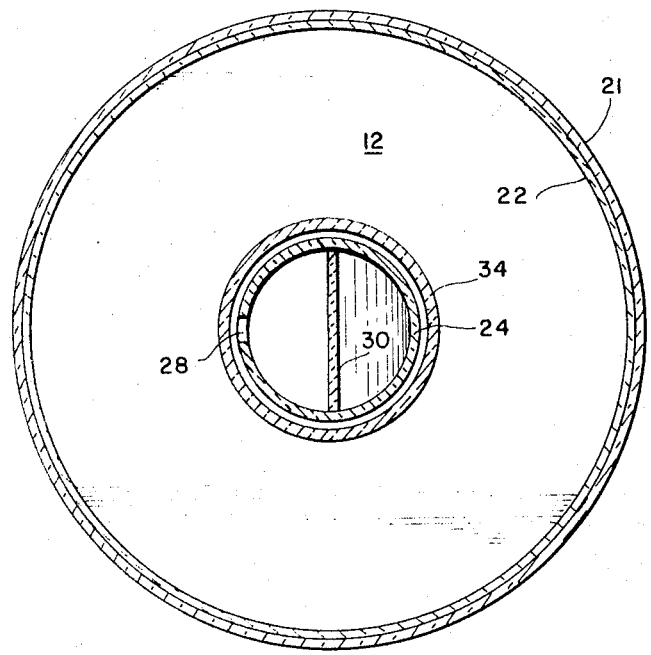
FIG. 2 is a top plan thereof.

Right circular cylinder 12 being configured as an annulus defines axial hole 20 or core in which is rotatably mounted a hollow tube 24 of diameter slightly less than hole 20 and which is free to turn at considerable speed in the hole. The circumference of outer wall 21 and inner wall 34 as well as tube 24 are to be made round and concentric to a high degree. In the arrangement illustrated in FIGS. 1 and 2, the diameter of the axial tube should not be much less than 70% of the height of the right circular cylinder of laser material. Axial tube 24 contains mirror 26 on its outer surface, except for one small vertical slit 28 of about 5° or less. Since the outer perimeter 21 of the right circular cylinder is mirrored on its inner face, there is provided a closed cavity arrangement consisting of the various radii of the right circular cylinder between mirror 22 and mirror 20 on the outer face of axial tube 24. Inside axial tube 24, mounted at an angle of 45° with the axis and facing in the direction of transparent vertical slit 28 is mirror 30, the purpose of which is to deflect the light which is traveling radially in the right circular cylinder into an axial direction. According to this arrangement, all radial direction in this right circular cylinder are reflecting end cavities at any instance, except the particular radius which passes through the transparent slit 28 in axial tube 24. In this particular direction light escapes into the tube and is reflected 90° into the axial direction.

The laser system is pumped externally by means of light pump 18 from the flat top and bottom surfaces of the right circular cylinder in the conventional way while the axial tube is spun at an appropriate speed by some external drive mechanism. For example, if a once a second dumping of any given radius is desired, the axial tube 24 may be rotated at one revolution per second in the event there is one such slit 28. Alternately, if there are two slits, tube 24 may be rotated at one revolution per two seconds, or if there are four slits, tube 24 may be rotated one revolution every four seconds. In each case, of course, there is continuous lasing axially through rotating tube 24. Manifestly, the width of slit 28 as well as the speed of rotation of tube 24 determine the time of dumping through any given radius.

In this way light energy is being built up in all directions of the radial laser system except instantaneously in that direction which is coupled to the axial direction through the transparent vertical slit 28. The entire right circular cylinder 12 may thus be considered to be contributing to the laser action, but of course, the deflected light continuously escapes from the system along the same axial direction at all times.

According to this system, a large amount of active laser material is involved in the laser action and the percent coupling may be varied by changing the dimensions of the transparent vertical slit in the spinning axial tube. Also, the pulse length and percent coupling can be affected by changing the speed of rotation of the axial tube. As a result, partially reflecting coating in laser constructions are not necessary. As a practical matter, it is as easy to make perfectly cylindrical mirrors as it is to make flat mirrors and the problems of misalignment in mounting of the circular mirror elements are probably reduced.

In the modification illustrated in FIGS. 3, 4 and 5, a mirrored cone 32 having 90° vertex 36 is supported inwardly of tube 24 which may have any number of slits 128, each said slit having a mirror 126 on its leading edge and a non-reflective quench portion 130 on its trailing edge as to control the period of high Q and also quenching or Q spoiling. As illustrated in FIG. 9, some or all of the slits may have polarizing material 38 positioned so as to filter deflected light. Alternately, or simultaneously polarizing material 40 may be mounted transversely of the tube so as to filter the light as it is deflected from the axial mirror.

As illustrated in FIG. 7, each transparent slit 228 may simply have mirror 226 on its leading edge without the quench.

Another arrangement is shown in FIG. 8 wherein rotating tube 324 has a plurality of transparent vertical slits 328, each slit 328 having a leading quench 331 and adjacent leading edge mirror 326, together with trailing edge quench 330.

Advantages of this continuously lasing system over conventional leaking systems are manifest. Conventional systems are only fractionally resonant and the laser is usually developed in an outwardly radial direction, rather than in the highly concentrated axial direction of the present construction.

Manifestly, various changes in dimension of parts and materials may be employed without departing from the spirit and scope of invention, as defined in the subjoined claims.

I claim:
1. A laser construction comprising:
   (A) an active laser material configured as a right circular cylinder and having an inwardly radially reflective mirror supported in its peripheral wall;
   (B) a pumping source operatively aligned with said laser material;
   (C) an exteriorly mirrored axial tube extending through said active laser and rotatably supported co-axially with said laser material, said tube including a transparent vertical slit of non-mirrored exterior in parallel with said reflective mirror in said right circular cylinder;
   (D) an axially reflecting mirror angularly supported within said tube with its mirrored surface opposite said slit so as to deflect light traveling radially in said right circular cylinder into an axial direction.

2. A laser construction as in claim 1, said axially reflecting mirror being mounted at an angle of 45° with respect to said right circular cylinder.

3. A laser construction as in claim 1, said axially reflecting mirror being a mirrored cone having a 90° vertex co-axially aligned with said tube.

4. A laser construction as in claim 1, said tube including a plurality of transparent vertical slits.

5. A laser construction as in claim 2, wherein the diameter of said axial tube is not less than 70% of the height of the right circular cylinder.

6. A laser construction comprising:
   (A) an active laser material configured as a right circular cylinder and having an inwardly radially reflective mirror supported in its peripheral wall;
   (B) a pumping source operatively aligned with said laser material;
   (C) an exteriorly mirrored axial tube extending through said active laser and rotatably supported co-axially with said laser material, said tube including a transparent vertical slit of non-mirrored exterior in parallel with said reflective mirror in said right circular cylinder;
   (D) an axially reflecting conical mirror supported within said tube so as to deflect light traveling radially in said cylinder and through said transparent slit into an axial direction.

7. A laser construction as in claim 6, each said transparent slit having a vertical mirror at its leading edge and a non-reflecting quench portion at its trailing edge supported in parallel with said reflective mirror in said right circular cylinder.

8. A laser construction as in claim 6, said exteriorly mirrored tube being comprised of a vertical mirror on the leading edge of each said transparent slit.

9. A laser construction as in claim 6, each said transparent slit having a non-reflecting quench portion and a sequentially aligned and contiguous mirror portion on its leading edge, and having on its trailing edge a black quench portion.

10. A laser construction as in claim 1, including a light polarizer positioned in said tube so as to filter light reflected from said right circular cylinder through said tube.

References Cited

UNITED STATES PATENTS 3,241,085  3/1966  Marcatili.

RONALD L. WIBERT, *Primary Examiner.*

PAUL K. GODWIN, *Assistant Examiner.*